United States Patent Office 3,557,560
Patented Jan. 26, 1971

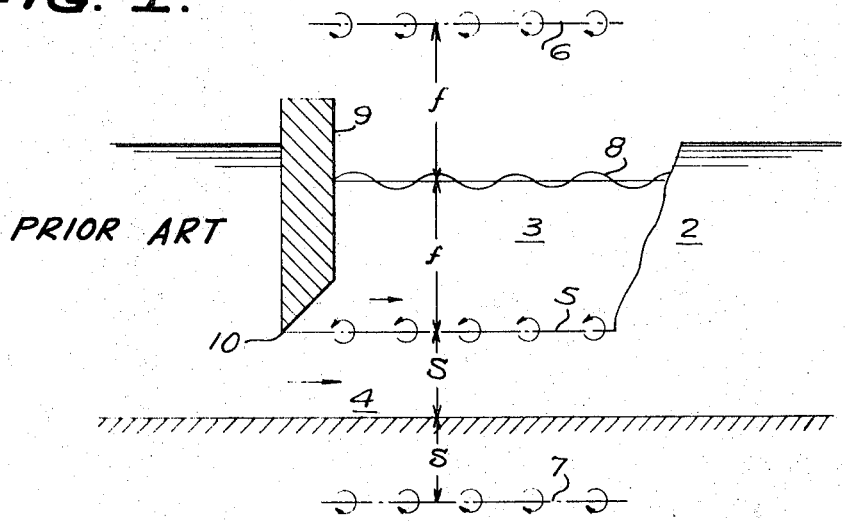
FIG. 1.
PRIOR ART
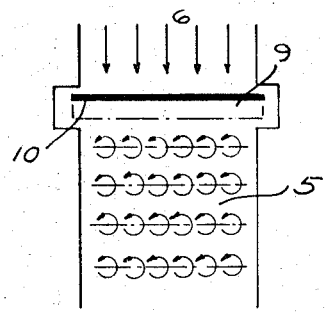
FIG. 2.
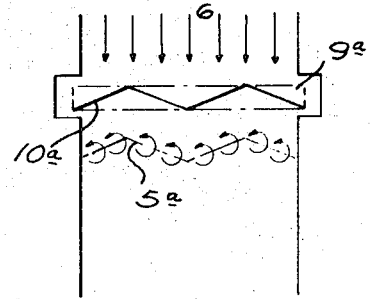
FIG. 3.
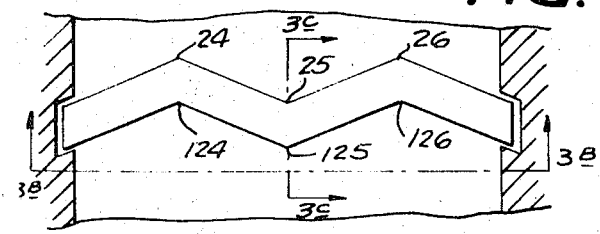
FIG. 3A.
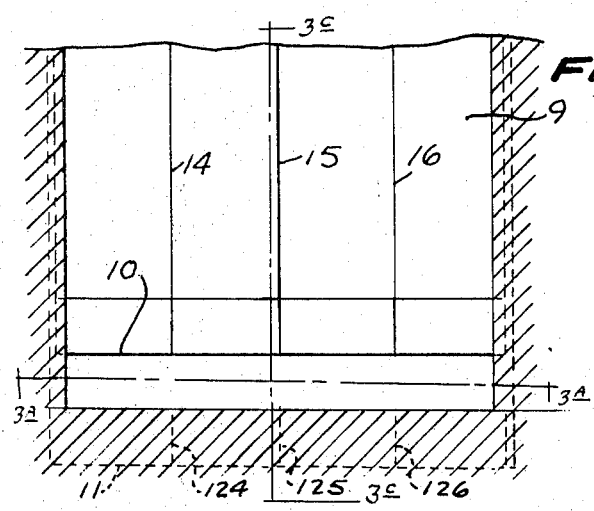
FIG. 3B.
FIG. 3C.

3,557,560
VIBRATION DAMPER FOR A HYDRAULIC SLUICE-GATE
Yasuyoshi Nakajima, Ibaraki-shi, Japan, assignor to Hitachi Zosen Kabushiki Kaisha, Osaka, Japan, a corporation
Continuation-in-part of application Ser. No. 459,639, May 28, 1965. This application May 15, 1968, Ser. No. 729,208
Int. Cl. E02b 7/28
U.S. Cl. 61—28                    3 Claims

ABSTRACT OF THE DISCLOSURE

The present invention is concerned with leaves for preventing the leaf of a single sluice-gate positioned transversely across a conduit from vibrating during the passage of water therethrough with the leaf or conduit or leaf and conduit having special surfaces for defining the downstream portion of said flowing water and the bottom edge of the leaf being horizontally non-linear whereby three-dimensional vortices are generated on the downstream side of the gate or the regular vortex eddies are restricted and are not generated on the downstream side.

---

The present application is a continuation-in-part of my copending application, Ser. No. 459,639, filed May 28, 1965, and now abandoned.

The invention will be understood from the following specification taken with the accompanying drawings wherein:

FIG. 1 is a general illustration of a sluice-gate and the phenomena accompanying the flow of a stream past the sluice-gate particularly on the downstream side.

FIG. 2 is a bottom plan view of an arrangement of the prior art with a leaf in the sluice-gate having a straight edge, and the accompanying flow phenomena.

FIG. 3 shows an embodiment of the present invention as a bottom plan view of the lower edge of the leaf having a zigzag edge and the corresponding distributed vortex eddies caused thereby.

FIGS. 3A, 3B, and 3C are respectively, a plan view of the leaf stop, a front view of the leaf and leaf stop, and a vertical sectional side elevation of the leaf and leaf stop.

Figure 4:
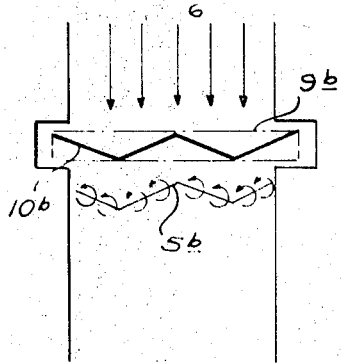

FIG. 4 is a bottom plan view of the bottom edge of the leaf and the related stream phenomena.

Figure 5:
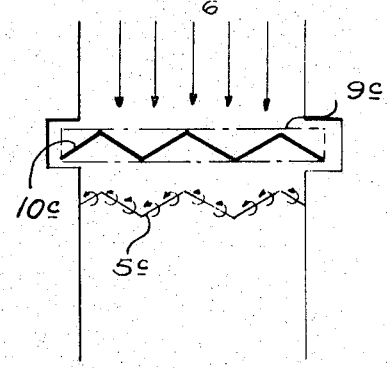

FIG. 5 is a view similar to FIG. 4, but of a leaf bottom with three zigzags.

Figure 6:
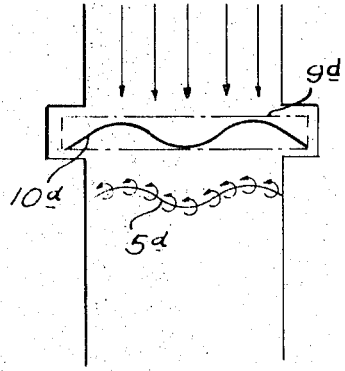

FIG. 6 is also a view similar to FIG. 4, but with a leaf bottom with a sinusoidal form.

Figure 7:
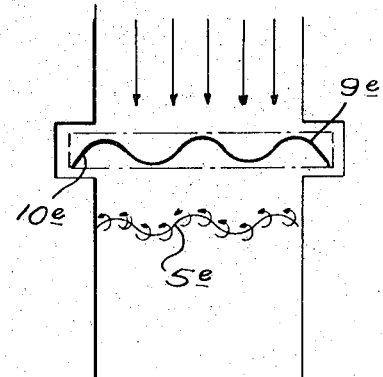

FIG. 7 is a view similar to FIG. 4, but with a leaf bottom having an inverted sinusoidal form.

Figure 8:
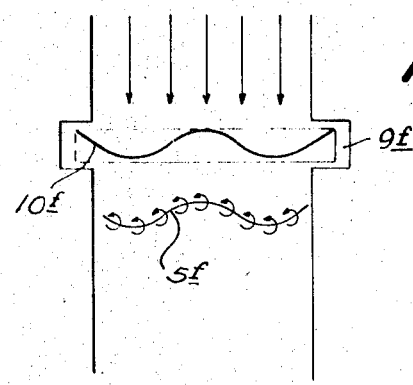

FIG. 8 is a view similar to FIG. 4, but with a leaf bottom having a three-cycle sinusoidal form.

Figure 9A:
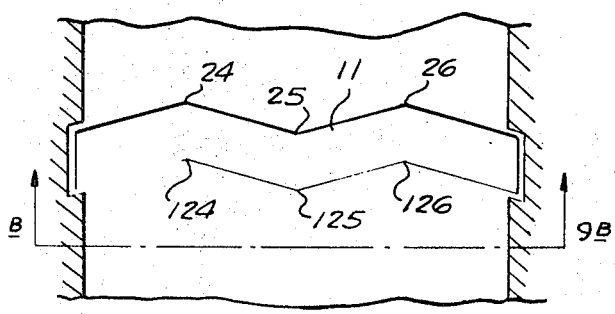

FIG. 9A is a top view of a modified form of leaf and leaf stop therefore.

Figure 9D:
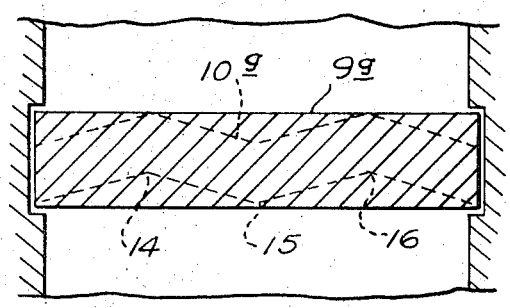
Figure 9B:
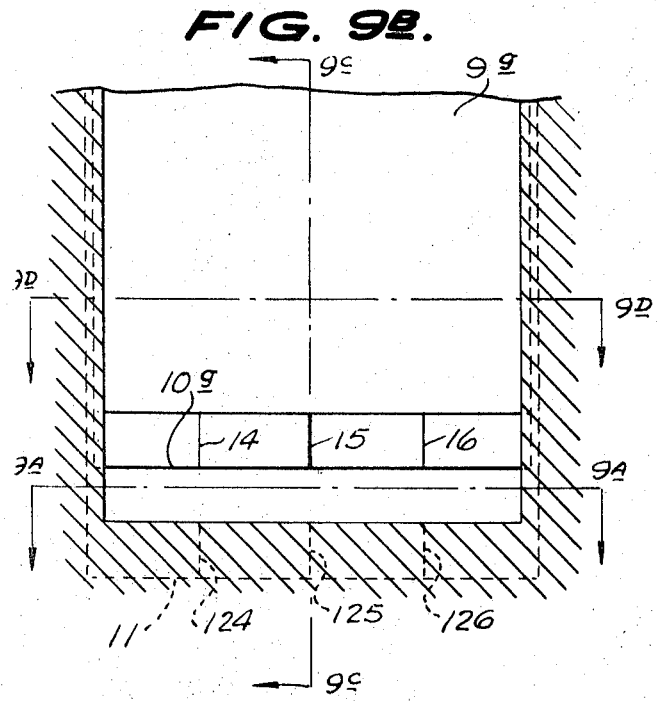

FIG. 9B is a cross-sectional view taken on line 9B—9B of FIG. 9A.

Figure 9C:
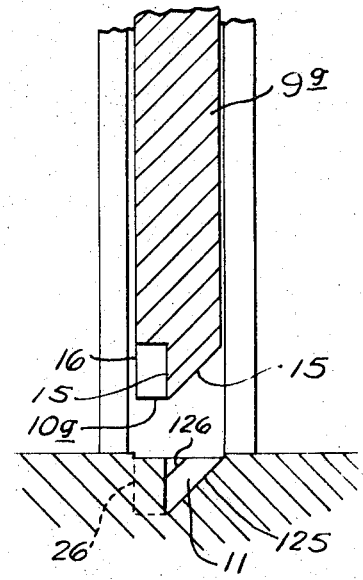

FIG. 9C is a cross-sectional view taken on line 9C—9C of FIG. 9B.

And FIG. 9D is a cross-sectional view taken on line 9D—9D of FIG. 9B.

It has been well known that, in a leaf of a sluice-gate for a submerged outflow of water under a relatively low head such as those used for controlling and regulating a water level of a river and a lake, a vigorous vibration is apt to occur as a result of fluctuation in water pressure. However, no method has been proposed for preventing the leaf from such vibration.

In case of such a submerged weir as shown in FIG. 1 which will be referred to hereinafter in connection with embodiments of this invention, there occurs a dead water region 3 between a leaf 9 and a submerged hydraulic jump region 2 so that the interface between the flowing water 4 leaving the opening under the leaf 1 and the dead water region 3 becomes a so-called surface of discontinuity resulting in generating a line of vortices 5. It is possible to consider that the line of vortices 5 flows away downstream at a constant velocity under a hydrodynamic relation with an image with respect to the water surface, an image with respect to the bottom surface of the conduit, and a surface wave 8, while forming regular vortex eddies. Although the first image 6 with respect to the water surface has an alternative sign, plus or minus, depending upon the value of the Froude number $C\sqrt{gf}$, which results in changing the direction of the vortex, it may be that regular vortex eddies will be formed in any case. Although a system which combines these vortex eddies 5 with the surface wave 8 is not considered to be in such a completely stabilized state as the so-called Karman vortex eddies, yet it is possible that an appreciable regular phenomenon may occur and it has been confirmed that a period of fluctuation in water pressure theoretically calculated from a model of the above-stated vortex eddies coincides well in fact with a period of substantial fluctuation in water pressure experimentally obtained.

In accordance with this present invention, the bottom edge 10a (FIG. 3) of leaf 9a which is vertically displaceable in a sluice-gate, is horizontally deformed out of a straight line to have a zigzag form, whereby three-dimensional vortices are generated on the downstream side of the sluice-gate, and the usual vortex eddies are restricted and are not generated on the downstream side.

When a gate leaf 9 has a horizontally linear bottom edge 10 as shown in FIGS. 1 and 2, regular two dimensional vortex eddy arrays 5 are formed in the downstream water 4 flowing from behind the gate in the flowing direction. Since the vortex eddies are displaced rearwards at a constant velocity, fresh vortices are generated regularly at the bottom edge 10 of the leaf 9.

When the leaf 9 is provided with such a bottom edge 10 as is shown in any of the FIGS. 3 to 8, inclusive, in accordance with this invention, although active vortices 5a are generated at the bottom edge 10a, the vortices are unstable three-dimentional ones, so that they disappear immediately, with the result that there is never formed the vortex eddies in the downstream flowing water. Therefore, no regular vibromotive force is applied to the gate. It is to be seen that the leaf stop 11 is to be formed correspondingly to the shape of the bottom edge 10a of the leaf 9a to be cooperated therewith.

In accordance with this present invention, the bottom edges 10a to 10f of the present leaves 9a to 9f are bent or curved in a special manner such as a zigzag or other non-linear manner. The number of zigzags may be any number greater than one, although two and three have been described.

FIGS. 3A, 3B, and 3C illustrate the first embodiment comprising a leaf 9a and a leaf stop 11. The leaf 9a is formed in a shape having three vertical folds 14, 15, and 16 so that the bottom edge 10a has also has three angular bends. The bottom edge 10a is tapered as shown in FIG. 3C. The leaf stop 11 is shaped correspondingly to the bottom edge 10a. The vertical section is illustrated in FIG. 3C. The horizontal shape is illustrated in FIG. 3A, having zigzag edges, the front edge and the rear edge. The front edge in the downstream side has three angles 124, 125, and 126, while the rear edge in the upstream side has three angles 24, 25, and 26. The lowermost line of the leaf stop 11 is quite similar to the rear edge.

For the forms of each of FIGS. 4-8, the leaf stop has a cut-out of corresponding registering contour as for FIG. 3.

FIGS. 9A, 9B, 9C, and 9D illustrate a second modified embodiment comprising a leaf 9b and a leaf stop 11. The leaf 9f itself does not have the three folds of FIG. 3, but the bottom edge 10b only has such three folds as the first embodiment. Such difference between the first embodiment and the second embodiment may be understood by comparing FIG. 3C with FIG. 9C. FIG. 9D is a horizontal sectional view of the leaf 9b taken along line 9D—9D of FIGS. 9B and 9C, while FIG. 9A is a corresponding plan view of the leaf stop 11.

I claim:

1. In a vibration damper for a hydraulic sluice-gate, a conduit having a base and lateral sides, a sluice-gate leaf mounted for vertical displacement in said sluice-gate to a controllable elevation above the base of said conduit, said leaf having a bottom edge with a horizontal non-linear contour in the direction of flow on the two horizontally opposite sides of said bottom edge, and the portion of the base of said conduit in register with said so contoured bottom edge of said leaf constituting a leaf stop having a depressed groove contoured to correspond to said contour of the bottom edge of said leaf and in register therewith, whereby three-dimensional eddies are produced by a stream of water flowing through said conduit past said leaf.

2. A vibration damper according to claim 1, said contour of said bottom edge of said leaf and said contour of said groove of said leaf stop in the base of said conduit having mutually corresponding zigzag forms.

3. A vibration damper according to claim 1, said contour of said bottom edge of said leaf and said contour of said groove of said leaf stop having mutually corresponding sinusoidal forms.

References Cited
UNITED STATES PATENTS

| | | | |
|---|---|---|---|
| 1,093,425 | 4/1914 | Hurst | 61—28 |
| 2,593,969 | 4/1952 | Bowtell | 61—28 |
| 3,086,366 | 4/1963 | Danel | 61—28 |

PETER M. CAUN, Primary Examiner